United States Patent Office 3,498,903
Patented Mar. 3, 1970

3,498,903
ELECTROLYTIC DIAPHRAGM CELL FOR PRODUCTION OF CHLORINE, HYDROGEN AND ALKALIES
Georgy Mikirtiechevich Kamarjan, Ulitsa Vorontsovskaja 30b, Apt. 18, Moscow, U.S.S.R.
Filed Mar. 4, 1964, Ser. No. 349,357
Int. Cl. B01k 3/10; C22d 1/06
U.S. Cl. 204—266         8 Claims

ABSTRACT OF THE DISCLOSURE

An electrolytic cell having a metal frame and a metal bottom electrically insulated from the frame and defining therewith a zone of electrolysis, at least one vertical metal partition being disposed parallel to the side wall of the frame and affixed to the frame so that a clearance is formed between the partition and said bottom, while said partition divides the zone of electrolysis into compartments. A plurality of rows of vertically disposed hollow cathodic elements in the form of a framework with a metal screen stretched thereover are affixed to the partition and to those side walls of the frame which are parallel to said partition to form a free passage between the rows of cathodic elements; anodes are disposed between the cathodic elements and are secured to the bottom by metal clamps. The frame is surmounted by a cover and liquid discharge means are mounted on the frame.

---

This invention relates to electrolytic diaphragm cells for the production of chlorine, hydrogen, and alkalis.

Various designs of electrolytic diaphragm cells for the production of chlorine, hydrogen, and alkalis have been suggested heretofore, of which monopolar cells, such as Hooker, Diamond cells and others have been mainly used.

These cells comprise electrode assemblies made of alternate rows of vertical graphite anodes and flat box-shaped cathode elements, enclosed in the cell tank to form one cathode made of metal screen or perforated sheet metal.

Anodes of the anode unit in the known electrolyzers are secured in the bottom of the cell or in its frame, through which current is supplied to the anodes.

More widely used are electrolytic cells in which current is supplied from the bottom, i.e. cells with the anodes secured to the tank bottom.

Electrolyzer parts of different polarity are electrically insulated from each other by various methods without affecting the hermetic tightness of the electrolyzer.

To obtain highly-efficient and economic diaphragm cells of the above types some problems pertaining to their design and operational processes are to be solved.

One such problem consists in designing a cell of great capacity compatible with small space-requirements and reasonable consumption of construction materials. It is necessary also to work out a cell design providing the lowest possible power consumption, which can be achieved by rational arrangement of power supply, and also by ensuring unobstructed circulation of the electrolyte in the electrode spacing and by maintaining the electrotype level high enough over the electrode surfaces, which will help obtaining higher yields per unit of current and low consumption of graphite anodes.

Lastly, it is necessary to solve the problem of designing a cell producing electrolytic products of high purity, both as to their concentration and analysis and ensuring performance reliability and simplicity of maintenance, assembling, dismantling, and repairs.

Some of these problems have been solved in various ways in the conventional cells.

Thus, hollow flat box-shaped cathodes are secured only to the two opposite walls of the cell tank, which is at the cathode potential, whereas the cathode screen is welded only along the perimeter in the upper and lower portions of the tank. To provide for a sufficient active cathode face and, at the same time, to obtain the most economical outline of the cell, i.e. to make its horizontal section as square as possible, the cathode elements are made elongated. The increase in the cathode length is one of the main means by which the production capacity of the known cells is improved.

All this results in uneven distribution of current on the electrode elements; in higher electrolytic voltage; in the necessity of reinforcing the frame carrying the cathodes with the screen fastened thereon; increased weight and overall dimensions of the cell; in the installation in each electrolytic compartment formed by a pair of cathode elements of several anode plates, the majority of which have only two working edges.

Thus the known types of cathodes restrict the increase of the cell capacity and diminish the effectiveness of the use of the anodes.

In the known cells, the cathode screen is stretched on the frame of the cathodic elements and is fastened only along the perimeter of the cathode frame in its lower and upper portions, so that current is fed to the ports of the cathode screen remote from the cathode frame through the screen itself, which possesses a fairly high resistance. This leads to an increase in the electrolytic voltage and also to uneven distribution of current on the electrode faces.

The anode assembly in the known cells, where current is supplied from below, is composed of vertically positioned anodes arranged in rows and secured to the bottom of the electrolyzer. To the contact parts of the anodes, current is supplied through a lead casting and is fed from a metallic busbar, the outer end of which is connected to the mains.

Another design of the cell is also known, where current is supplied to the anodes through a metal bottom of the cell which serves as a support for the anodes. However, current is also fed from the cell bottom to the anodes through a lead casting.

Contact resistance between lead and graphite, and lead and other metals, is relatively high, and besides, this resistance can vary within wide limits due to various uncontrollable factors, which leads to an increased voltage of the electrolysis and to uneven distribution of current in the anodes due to inconstancy of the lead contact properties. Besides, lead is an expensive material, and hence its use makes the electrolysis less economical.

Moreover, the described mode of power supply to the anodes makes the assembly procedure of the cell more difficult, since it makes it necessary to combine the multi-cell cathode structure with a multirow anode block without possibility of adjusting the required uniform electrode spacing. This in turn deteriorates the distribution of the current in the electrodes and the cell efficiency.

In the known cells, the possibility of development of the electrodes in height is insufficiently used, which leads to an increase in the area occupied by the electrodes and to a rise in the cost of construction of the production shops.

Seals in the joints between the main elements of the cell—the cathode assembly and the anode pack, cathode bells and hoods—are not sufficiently reliable.

The cell design does not allow the cathode space to be fully charged with catholyte, which puts limitations to increasing the current efficiency of alkali yields.

These shortcomings and some other drawbacks of the known cells of the diaphragm type intended for the production of chlorine, hydrogen, and alkalies do not allow their production capacities to be considerably increased over those already achieved and the technological and economic characteristics of the electrolytic process to be improved.

Although attempts have been made to overcome said difficulties and shortcomings, they proved unsuccessful, and the diaphragm cells now in use do not fully meet the requirements.

It has been found that the problem of designing a diaphragm cell which will meet said requirements can be successfully solved as will be clear from the description.

The object of this invention is to design a powerful diaphragm cell which is very compact and whose construction does not require very much material.

Another object of the invention is to construct a powerful cell ensuring low current consumption per unit of the electrolytic product.

Still another object of the invention is to provide necessary conditions for obtaining high yields per unit of current and low consumption of anodes, which can be achieved by means of uniform current distribution on the face of the electrodes, of adjusting the diaphragm permeability, of providing free circulation of the electrolyte and unobstructed removal of gases from the cell.

An object of the invention is also to construct a powerful cell which will ensure stable performance, easy maintenance, simple assembling, dismantling and repairs.

Still another object of the invention is to construct said cell 20 that its production capacity can be increased by multiple use of standard parts and assemblies.

The objects of this invention are achieved by a rational design of the cell. Thus, an increased specific yield of the product per unit of the floor area, and hence reduced capital expenditure per unit of capacity, are obtained by means of a considerable increase in the working height of the electrodes and more rational utilization of their active surface, which can be achieved by the design of electrolytic passages and by properly chosen proportions of the main components of the cell.

A further increase of the electric loads in the cell, as compared to those practised now, is made possible, in accordance with this invention, by a special cathode construction and the anode pack structure and by their arrangement in the assembly.

Reduction of the working voltage, increased current efficiency and more rational utilization of graphite, stability and dependability in service may be obtained according to the invention by rational arrangement of contact systems, by intensified controllable circulation of the electrolyte and by new constructional solutions of the problem of the hermetic sealing of the cell.

Other objects and advantages of the invention will become apparent from a detailed description which follows hereinafter and the appended drawings in which.

According to this invention the cell (FIGS. 1, 2, 3) comprises cathode assembly 1, anode assembly 2, cover 3, and leads 4.

Figure 1:
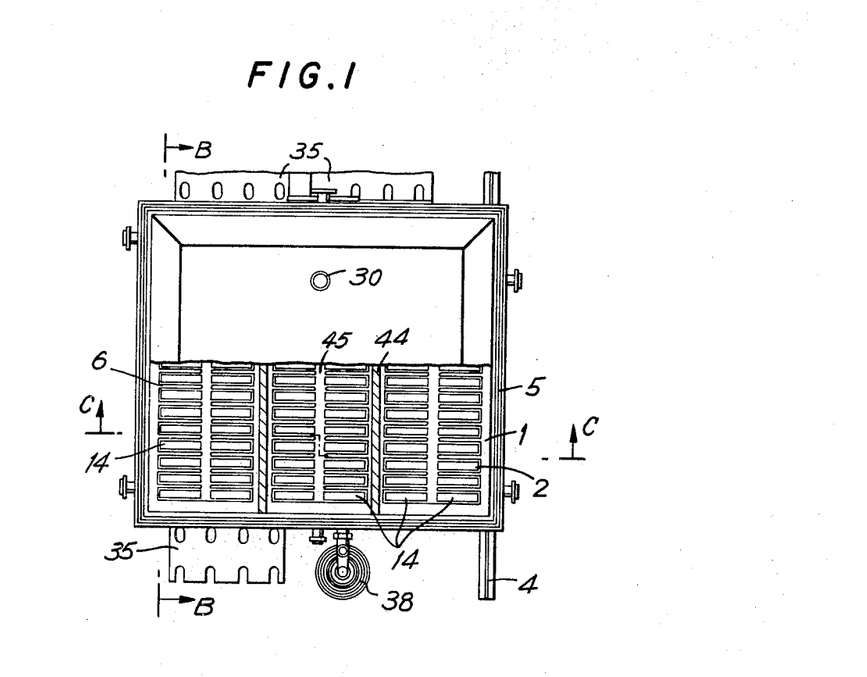
FIG. 1 is a top view of the cell, and also a section through A—A according to FIG. 2.
Figure 2:
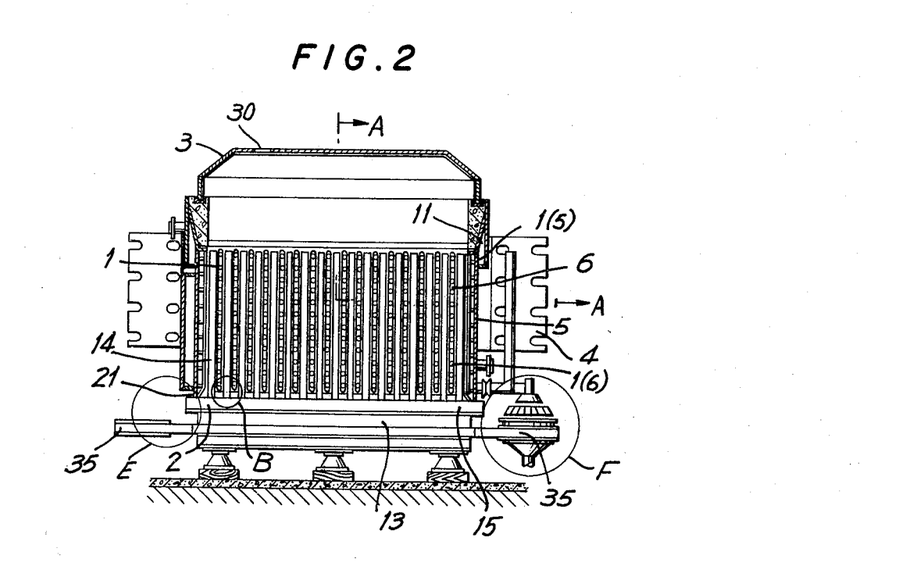
FIG. 2 is a section of the cell through B—B according to FIG. 1.
Figure 3:
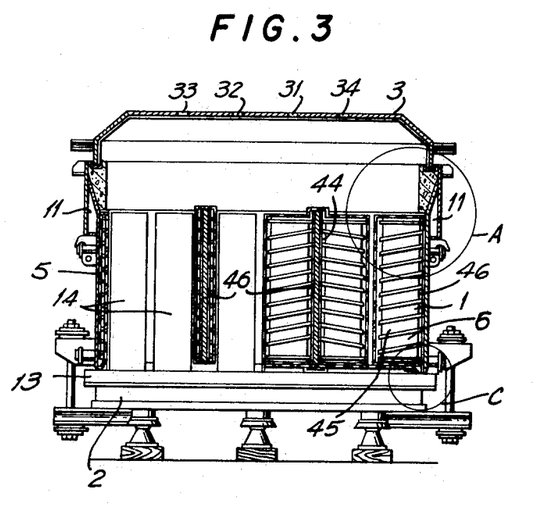
FIG. 3 is a section of the cell through C—C according to FIG. 1.

The cathode assembly of the cell consists of metal casing (frame) 5, which is open both at the top and bottom, and the cathode proper in the form of box-shaped elements 6, fixed inside the casing. The cathode assembly is shown in FIGS. 1, 2 and 3.

Casing 5 (FIG. 3), which may be rectangular, square, oval, or of any other shape, is divided by means of one or several metal partitions 44 into a corresponding member of compartments 45 open both at the top and bottom. The partitions, which divide the casing into compartments, are connected with the opposite walls of the casing by welding, bolting, or any other means in order to insure the desired electric contact between said partitions and said walls and to impart adequate mechanical strength to said partitions. Hollow cathode elements 6 comprised of a frame with a metal screen fitted around it are secured to parallel walls of cell casing 5 and to inner partitions 44 so that each compartment houses two parallel rows of cathode elements 6 separated by a central passage. In the cathode elements arranged in the shape of a comb, inner voids are connected with one another via channels 46 formed by cathode screen 8 (FIG. 7) and casing walls 5 or by said screen and internal partitions 44, to which said cathode elements are secured.

Figure 7:
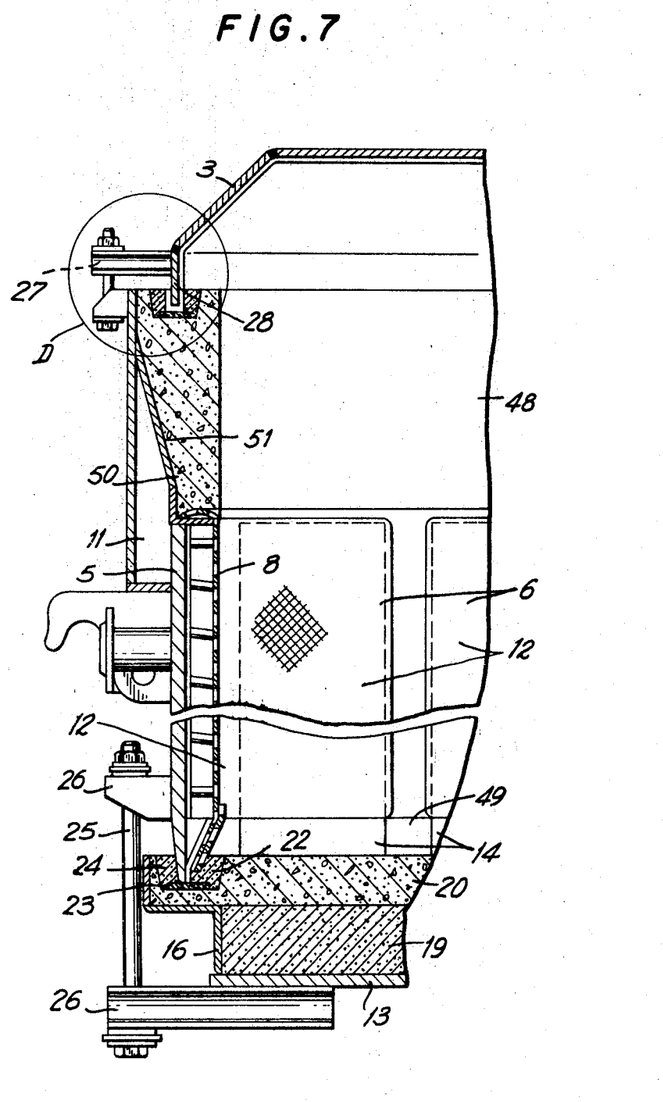
FIG. 7 is a section through C—C according to FIG. 1, showing a chlorine chamber and a sludge pit.

Said channels provide outlets for the electrolysis product formed on the cathode.

Cathode elements 6 inside each compartment form two rows of unit cells B (FIG. 2) which house anodes 14 (FIG. 3), said unit cells being connected with one another in the compartment through the central passage, and between compartments—through the open tops and bottoms. Current to the box-shaped cathode elements is supplied through appropriate walls 5 and partitions 44 of the cell casing.

Thus the cathode assembly, depending on the desired capacity of and the number of compartments in the cell will be comprised of two, three, four, etc. cathodes having identical design, size and arrangement of the cathode elements.

According to the preferred embodiment of the invention (FIG. 1), the length of the cathode elements 6 is selected to correspond to the width of anode plate 14; thus each unit cell formed by a pair of adjacent cathode elements 6 contains only one anode 14, which is surrounded by the cathode screen on three sides (on two sides with the cathode elements and on one side with the cathode screen).

Cathode elements 6 may be arranged either at right angles (FIG. 1) or inclined (FIG. 4) to walls 5 and to parallel partitions 44 of the cell casing.

Figure 4:
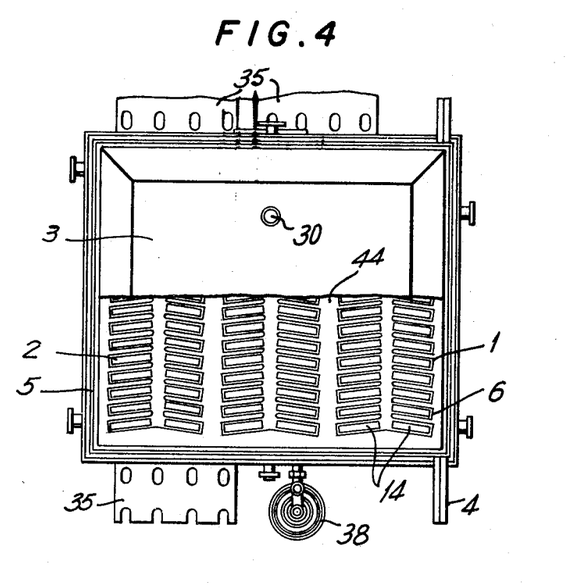
FIG. 4 is a view of the cell similar to that of FIG. 1 but showing a modification thereof.

An inclined arrangement of the cathode elements makes it possible to obtain in some cases a more advantageous proportion of the cell dimensions and also to extend the cathode surface.

In contrast to the electrolytic cells employed heretofore, frame 7 of cathode elements 6 in the present cell (FIG. 5) serves to supply current to cathode screen 8. The frame of the cathode elements consists of four-sided or three-sided member 9 and transverse stiffening ribs 10, which fix the shape and size of cathode elements 6.

Figure 5:
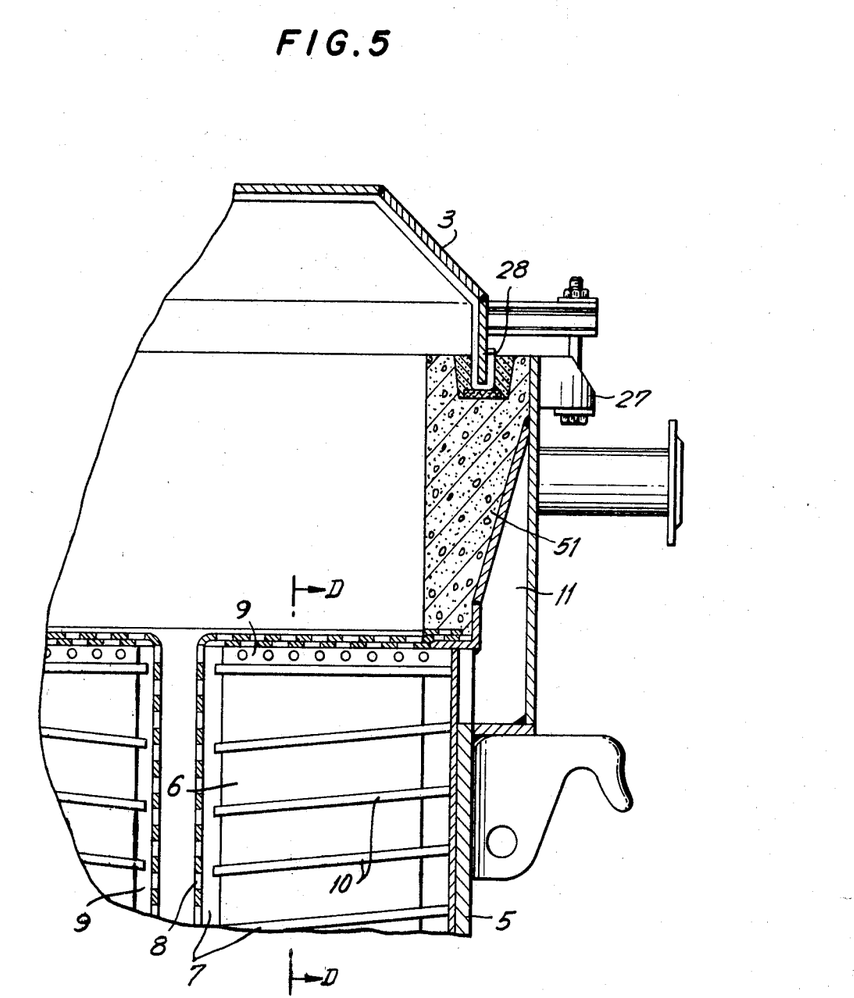
FIG. 5 is an assembly A according to FIG. 3 which is the frame of the cathode elements and the collector for alkali and hydrogen.

Frame bases contact walls of cell casing 5 or partitions 44 and are electrically and mechanically connected to them by welding, bolting, etc.

The frame carries metal screen 8 or perforated sheets, said screen or sheets being affixed to the frame, say by welding.

Figure 6:
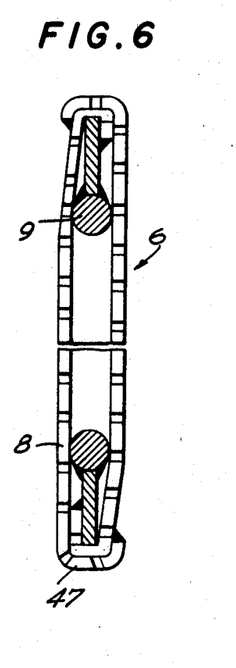
FIG. 6 is a section of the cathode element through D—D according to FIG. 5.

In order to deposit the asbestos diaphragm in localities where the screen contacts part 47 of the frame, said cathode screen is made to overlap said localities as shown in FIG. 6.

According to the invention, the design of the cathode in the cell (FIG. 5) insures reliable withdrawal of hydrogen from cathode elements 6. For this purpose transverse stiffening members 10 of the frame can be either furnished with openings or inclined in the direction of hydrogen flow.

According to the invention (FIGS. 2, 3, 5), the cell can be operated when the cathode chamber is filled completely or partially. To accomplish this, circular separator 11 is positioned along the periphery of cathode casing 5 above the upper ends of the rows of cathode elements 6, said separator serving to separate hydrogen and alkali outside the cathode chamber, and the walls of said separator being protected against the action of chlorine and anolyte. Therefore no gas space is required in the inner void of the cathode elements, and hence it can be entirely filled with catholyte.

Walls of cell casing 5 may terminate at the level of cathode elements 6, or they can be extended upwards and downwards to form chlorine chamber 48 and sludge pit 49 respectively (FIG. 7).

When the cell casing walls are extended upwards, metal mouth 50 is formed whose inner surface is protected from the action of chlorine by corrosion-resistant material 51 (rubber, concrete, ceramic, etc.).

On top of the mouth provision is made for cover 3 made of a chlorine-resistant material. The design of the mouth facilitates hermetic sealing of the cell.

To protect the cell casing walls, which form sludge pit 49, from the action of chlorine and anolyte, said walls are closed with a cathode screen with diaphragm 12 deposited on it.

The anode assembly of the cell (FIGS. 2, 3) is comprised of graphite anode plates 14 secured to metal bottom 13 of the cell which is made in the form of a trough with mouth 50, and, in case of the cell having several rows of anodes, also with current-carrying ribs placed parallel to the side walls of the bottom, the anode clamps being affixed to said ribs. The metal bottom serves to feed current to the anodes, and busbars 35 are connected directly to it.

In contrast to known cells, current is supplied to the contact parts of the anode plates in the cell of the present invention (FIG. 8) through metal clamps 15 or cups but not through a lead casting. Anode plates 14 are arranged in rows and joined in packs by securing the contact parts of several anodes in metal clamps 15 or cups.

The anode plates joined by the clamps or cups to form anode packs, are installed in parallel rows on the cell bottom, the butt contact end (FIG. 8) of the busbar of each anode pack being tightly braced by bolts to the contact surface of side walls 16 or ribs 17 of the bottom through which current is fed from the bottom to the anode packs.

Figure 8:
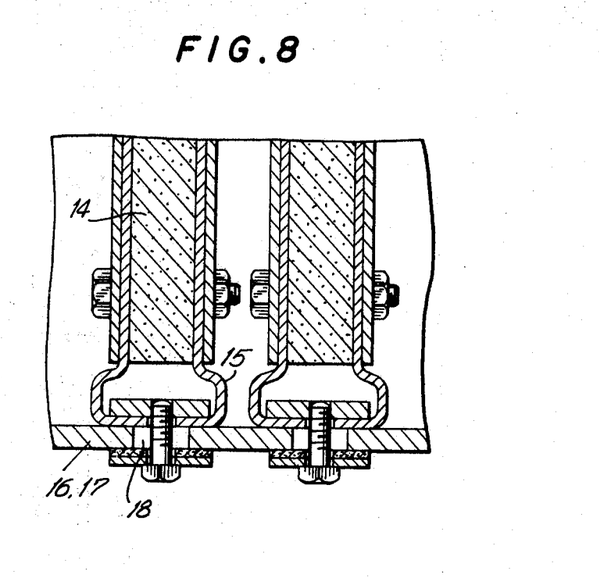
FIG. 8 is an assembly B of the anode fixture to the bottom, according to FIG. 2.

The anode plates are secured to the anode clamps, and these to the side walls and ribs of the bottom by bolts through oval holes 18 in clamps 15, side walls 16 and ribs 17 of bottom 27.

Anode packs may consist of one or several anode plates or rods and may be arranged in one or several rows.

In the present cell (FIG. 7) the metal bottom and the contacts of the anode plates are protected against corrosion by a two-layer protective cost. Lower layer 19 is a low-melting, low-pored material, e.g. a composition based on bitumen or asphalt with inert fillers (diabase powder, asbestos, etc.).

The composition of the lower layer is so selected that it becomes semiliquid under the action of heat being developed in the contacts during electrolysis; upon heating, the composition undergoes expansion, flows, seals itself and fills all pores and voids. Upper layer 20 is of concrete or some other suitable material.

Figure 9:
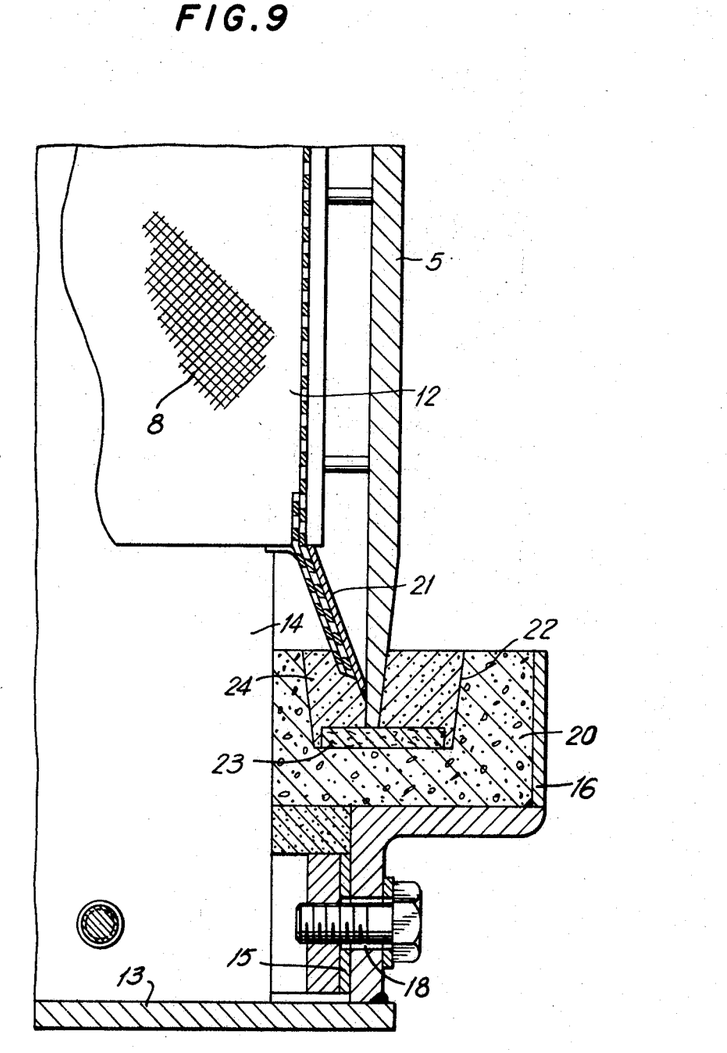
FIG. 9 is an assembly C for sealing the cathode and anode sections of the cell, according to FIG. 3.

Junction of the anode and the cathode assembly of the cell is shown in FIG. 9.

To insure a reliable junction between the anode and cathode assemblies, the lower portion of the cell casing is made in the form of wedge 21, whose vertical side is part of walls 5 of the cell casing, while the inclined side constitutes part of the cathode with diaphragm 12, and in the concrete layer of anode assembly 20, along the periphery of the bottom, circular groove 22 is made which contains packing gasket 23 and chlorine-resistant elastic putty 24, wedge-shaped end 21 of the cell casing being inserted into said groove. The anode and the cathode assemblies of the cells (FIG. 7) are braced tightly by coupling bolts 25 through coaxial sockets 26 for coupling bolts, said sockets being secured to the cell casing and to the bottom respectively and electrically insulated from them.

Figure 10:
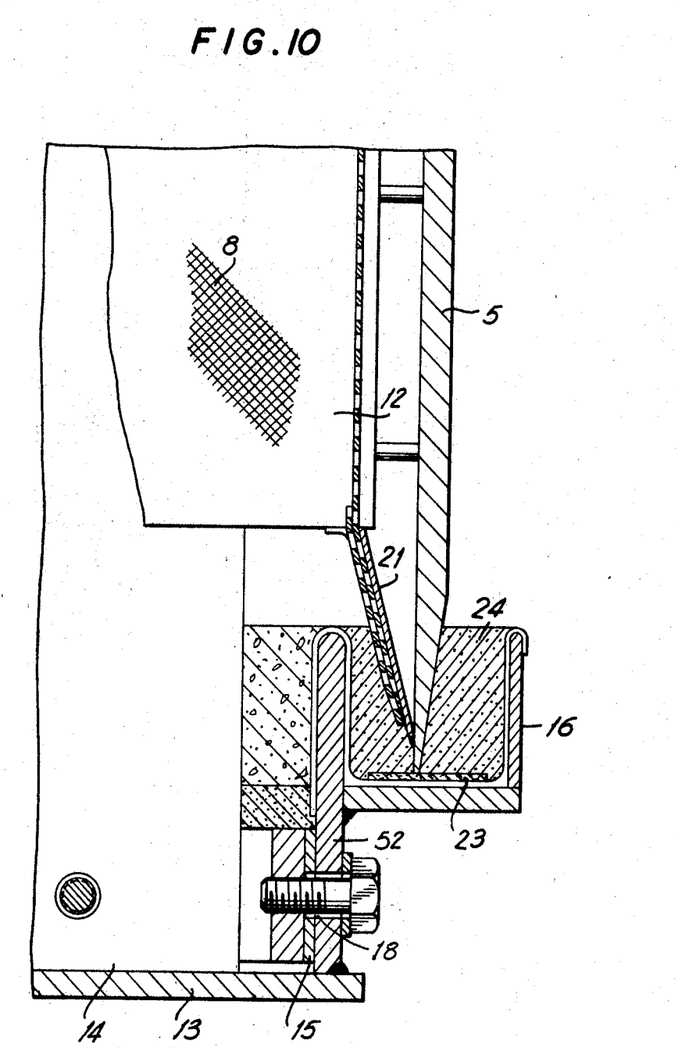
FIG. 10 is an assembly C of another version for sealing the cathode and anode sections of the cell.

The circular groove for securing the cell casing may be made by extending upwards side walls 52 of cell bottom 13 (FIG. 10).

Figure 11:
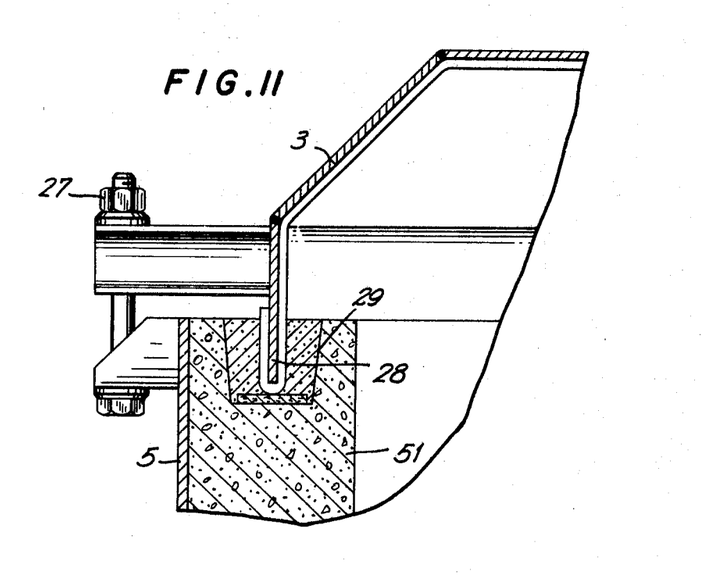
FIG. 11 is an assembly D, according to FIG. 7, of fixture of a rubber-lined metal cover to the tank.

Cell cover 3 (FIG. 11) is made in the form of a metal dome protected from chlorine by a rubber lining. The junction between the cover and the cell casing is sealed by coupling bolts 27 and a knife-edge seal, for which purpose rubber lined side walls 28 of the cover enter circular groove 29 in lining 51 of the upper part of the cell casing, said side walls resting on the rubber gasket and said groove being filled with putty. In the cover (FIG. 3) orifices are made for chlorine outlet 30, brine inlet 31, thermometer 32, vacuum gauge 33, and for the float of level gauge 34.

Figure 12:
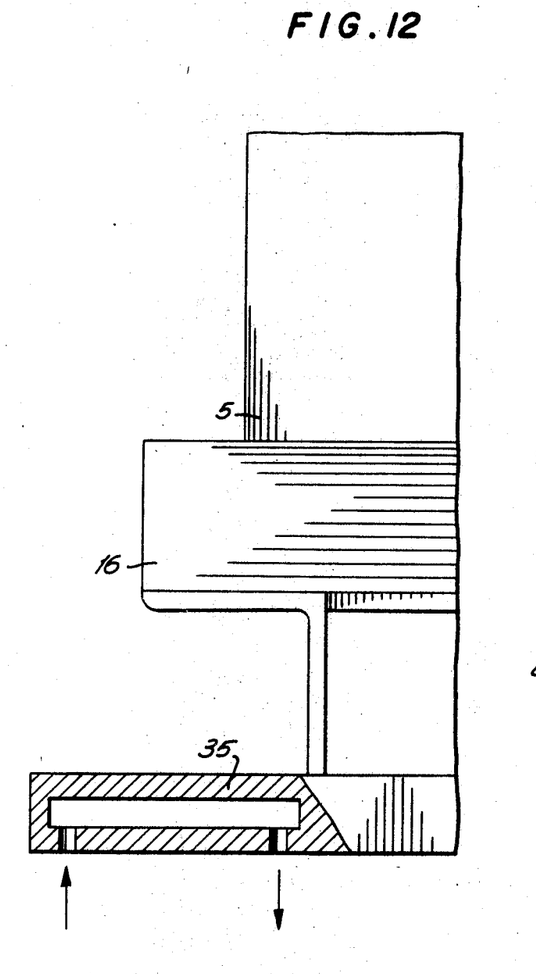
FIG. 12 is current supply busbars, assembly E, according to FIG. 2.

According to the invention (FIG. 12), terminal water-cooled busbars 35 are made in the form of bars of rectangular cross-section with passages for coolant.

Figure 13:
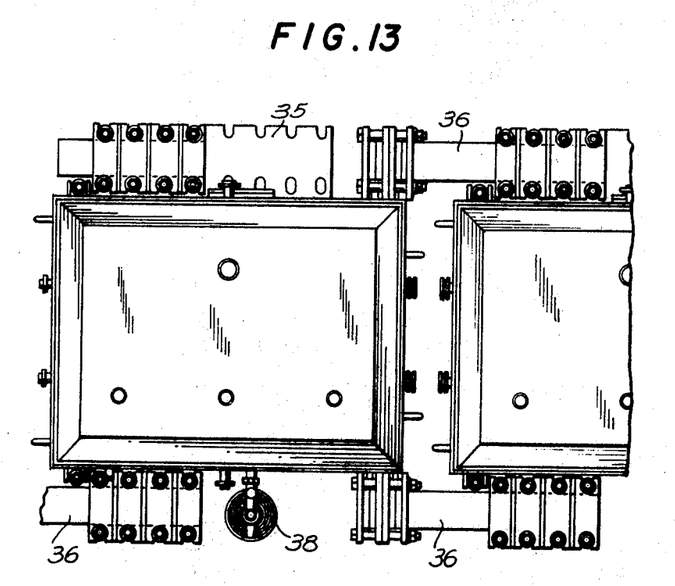
FIG. 13 is a top plan view of a row of tanks with busbars in a passage between the cells.
Figure 14:
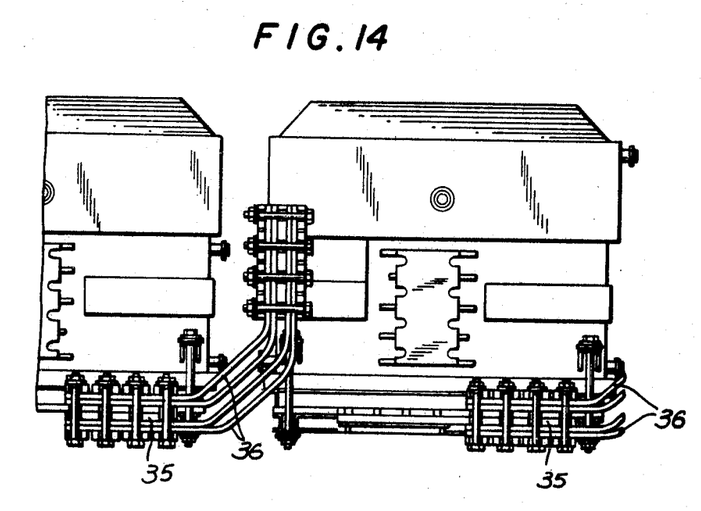
FIG. 14 is a side view of a tank row.

According to the invention, outer busbars 36 (FIGS. 13, 14) which connect the cells in series, are removed from the space between adjacent cells and placed in the passage between the rows of cells in such a manner that the overall dimensions of the cell are not increased.

Figure 15:
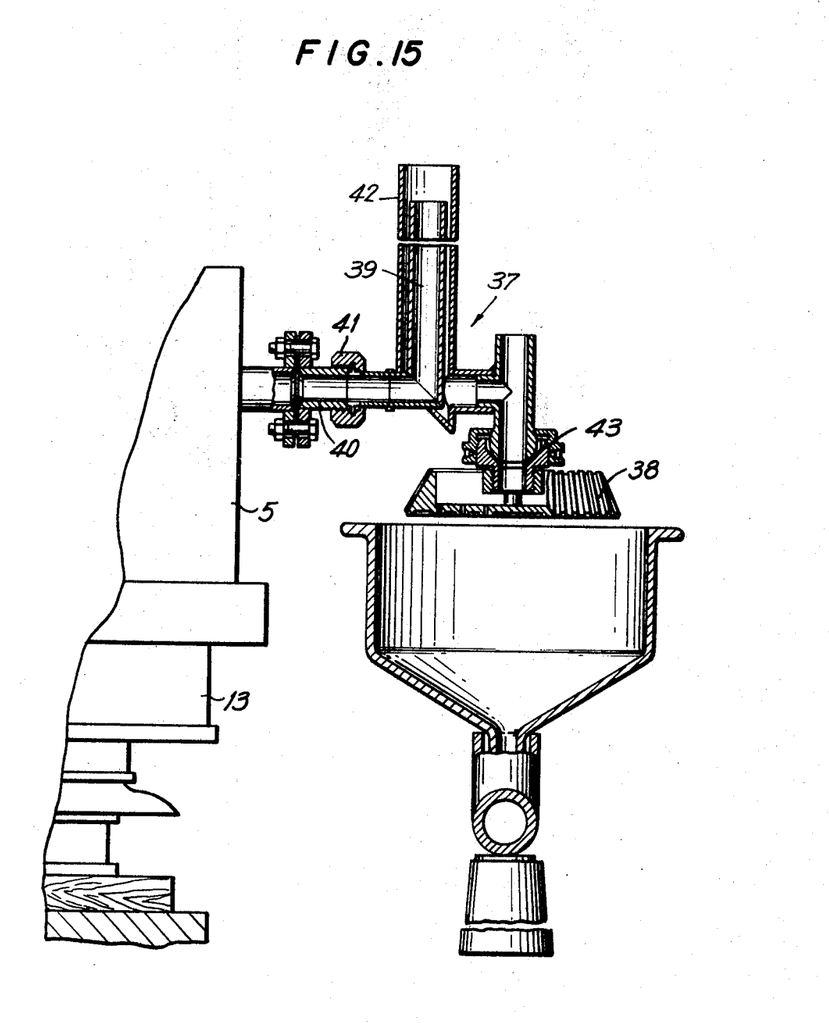
FIG. 15 is alkali drainage from the cell assembly F according to FIG. 1.

In the cell of the present invention a simple and reliable device is provided for discharging catholyte from the cathode chamber and for adjusting the catholyte level in the cathode chamber. The unit for discharging alkali from the cathode chamber is shown in FIG. 15. It consists of seal 37 designed to control the catholyte level and device 38 for interrupting the flow of alkali to prevent current losses.

The alkali outlet unit is made of two concentrically positioned and rigidly connected pipes, inner pipe 39 being hinged to catholyte outlet union 40. Pipe 39 can be rotated about its horizontal axis. Coupling nut 41 serves to hermetically seal the hinged joint.

The lower part of outer pipe 42 is provided with a sleeve for the discharge of alkali, dropper 38, which is designed to interrupt the flow of alkali, being hinged to said sleeve.

The required catholyte level is obtained by tilting the overflow pipe hinged to the catholyte outlet unit. The position of the dropper in this case remains unaltered, since it freely turns round hinge 43 on the discharge sleeve.

Although a preferred embodiment of the invention has been disclosed in this description, it should be understood that various changes and modifications may be made without departing from the spirit and scope of the invention which will be obvious to those skilled in the art. Thus, for instance, several anodes may be placed in an electrolytic passage formed by two cathode elements; the cathode may have no alkali or hydrogen separator and may work without complete filling of the space, etc. Such changes and versions are considered to fall within the spirit and the scope of the invention.

What I claim is:

1. A diaphragm cell for production of chlorine, hydrogen and alkalis, said cell comprising a metal current-carrying bottom; vertically disposed anodes, means securing said anodes at their lower ends to said bottom for conducting current from the bottom to the anodes in parallel, a metal frame mounted on said bottom and electrically insulated therefrom, said frame including parallel walls and at least one vertical metal partition disposed parallel to the walls of said frame and secured thereto in such a manner that a clearance is formed between said partition and bottom to divide the internal space confined by said frame into compartments, hollow box-shaped cathode elements disposed vertically and assembled as a framework, a metal screen stretched on said cathode elements and secured to said partition and to said walls of the frame for supply of current to the cathode elements in parallel, a porous diaphragm covering the screen on said cathode elements, a lid disposed above said frame, means for supplying current to the cell bottom and to said frame, and a discharging device mounted on said frame to maintain and vary the catholyte level in the cell.

2. A diaphragm cell according to claim 1 in which said framework of the cathode elements includes inclined ribs to direct hydrogen from the internal space of said cathode elements.

3. A diaphragm cell according to claim 1 in which said frame has a lower portion with a periphery of wedge-shaped cross-section, said bottom including a wide wall of concrete with a groove therein, an elastic non-conductive packing in said groove, bitumen filling said groove, the wedge-shaped lower portion of the frame resting on said packing, and insulated means engaging said frame and bottom.

4. A diaphragm cell according to claim 1 comprising electric poles to which external busbars are to be connected positioned in the passage between the rows of the cells.

5. A diaphragm cell according to claim 1, wherein said discharging device comprises a hydraulic shutter consisting of two concentric pipes secured to a connection for the catholyte outlet and provided with an interrupter of alkali jets, said interrupter being mounted at the point of the alkali outlet from the discharging device by means of a hingle coupling enabling the interrupter to turn in any plane.

6. A diaphragm cell according to claim 8 in which said bottom includes side walls and at least one inner partition which is parallel to side walls of said bottom, said clamping means securing the anodes to said bottom and to said side walls of said bottom.

7. A diaphragm cell according to claim 8 wherein said clamping means comprises metal clamps secured to said anodes on opposite sides thereof and engaged in holes provided in the side walls of said bottom and in each partition thereof, said holes being oval to enable controlling the distance between the surfaces of said anodes and cathode elements.

8. A diaphragm cell according to claim 1, wherein the means securing the anodes to the metal bottom comprises metal clamping means which envelops the lower portions of said anodes and is adjustably secured to said bottom to control the distance between the surfaces of the anodes and the cathode elements.

References Cited

UNITED STATES PATENTS

| 804,931 | 11/1905 | Cassel | 204—278 |
|---|---|---|---|
| 1,471,641 | 10/1923 | Adams | 204—266 |
| 1,771,091 | 7/1930 | Lawaczeck | 204—252 |
| 2,414,741 | 1/1947 | Hubbard | 204—275 |
| 2,447,547 | 8/1948 | Stuart | 204—266 |
| 3,030,295 | 4/1962 | LaBarge | 204—242 |
| 2,987,463 | 6/1961 | Baker et al. | 204—266 |
| 3,247,090 | 4/1966 | Forbes | 204—256 |

FOREIGN PATENTS 600,441    6/1960    Canada.

JOHN H. MACK, Primary Examiner

D. R. JORDAN, Assistant Examiner

U.S. Cl. X.R.

204—286, 258, 283, 128, 129